June 15, 1965    R. D. JOHNSON    3,188,794
ILLUMINATED CHAIN AND LINKS THEREOF

Filed March 28, 1961    5 Sheets-Sheet 1

RAYMOND D. JOHNSON
*INVENTOR.*

BY

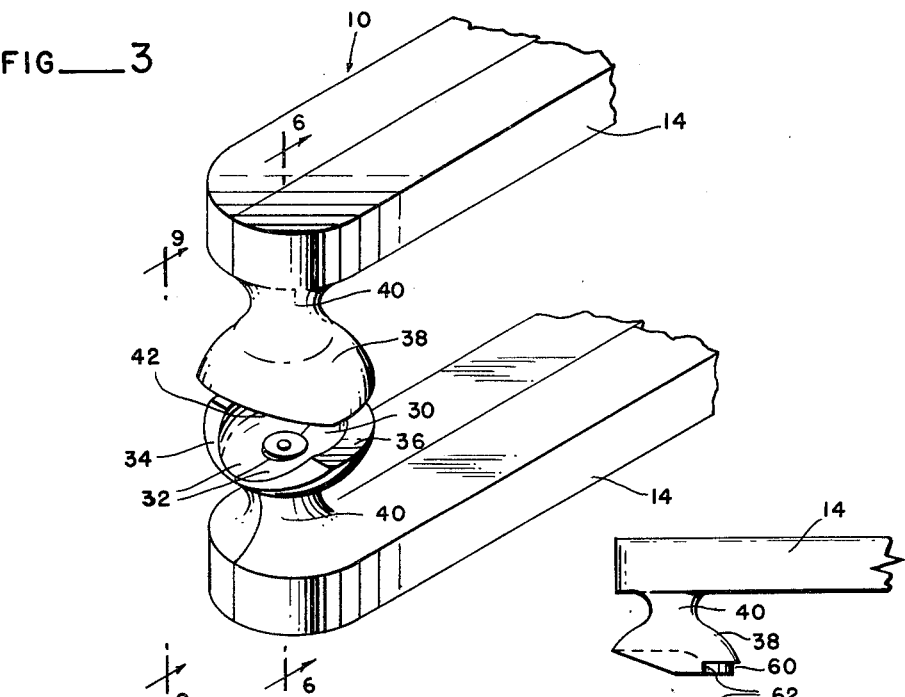
FIG. 3
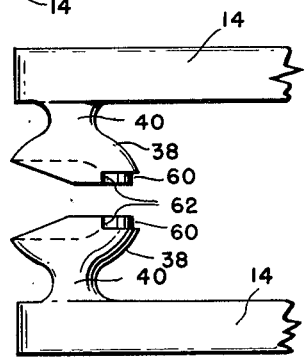
FIG. 12
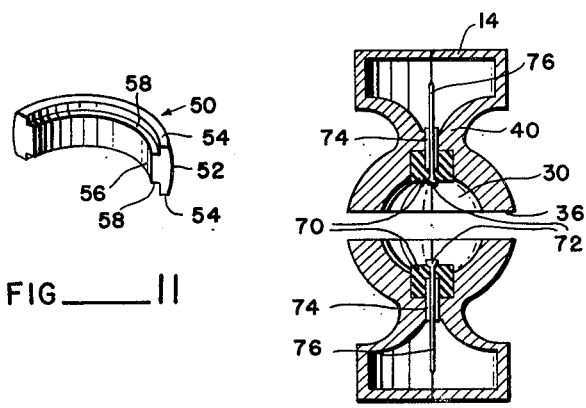
FIG. 11
FIG. 6
RAYMOND D. JOHNSON
INVENTOR.

June 15, 1965 R. D. JOHNSON 3,188,794
ILLUMINATED CHAIN AND LINKS THEREOF
Filed March 28, 1961 5 Sheets-Sheet 3

RAYMOND D. JOHNSON
*INVENTOR.*

BY [signature]

June 15, 1965  R. D. JOHNSON  3,188,794
ILLUMINATED CHAIN AND LINKS THEREOF
Filed March 28, 1961  5 Sheets-Sheet 4

RAYMOND D. JOHNSON
*INVENTOR.*

BY

RAYMOND D. JOHNSON
*INVENTOR.*

United States Patent Office 3,188,794
Patented June 15, 1965

3,188,794
ILLUMINATED CHAIN AND LINKS THEREOF
Raymond D. Johnson, 11624 SE. 184th, Renton, Wash.
Filed Mar. 28, 1961, Ser. No. 98,818
9 Claims. (Cl. 59—78.1)

This invention relates to chain links, particularly to chain links which are identical and detachable and capable of being illuminated.

This invention constitutes an improvement over applicant's United States Patent No. 2,618,922, issued November 25, 1952, in that the chain link herein has increased load-carrying capacity over the design set forth in the aforesaid patent. Such increased load-carrying capacity has been accomplished basically by increasing the socket bearing surface area in which the round jaw elements of the open end of the chain link are held. Furthermore, the improved design herein is such that once the links are joined they cannot be separated unless they are either disconnected in the prescribed manner or broken.

The chain link to which this invention is directed is with its illuminating feature primarily a decorative item. Applicant's device would achieve its greatest aesthetic effect at night when garden parties, fair grounds, displays and other occasions demanded attractive decorations. A chain using this invention could be provided with multi-colored links to give a highly pleasing and eye-appealing effect. The concept of this invention may also be utilized for more practical purposes, such as strong, flexible, continuous length light.

In general the decorative value of this invention is attained by providing a hollow, translucent, plastic body with appropriate illuminating means within the body. Thus, the actual illuminating elements are concealed within the confines of the translucent walls. The body itself may partake of many shapes and sizes only two of which embodiments are shown in this specification for the purposes of illustration. Each body has two ends or locations provided with matching electrical contacts so that the links may be joined together to convey electrical power from one link to the next.

Electrical conduit means within each body convey the electrical power from one set of contacts to a second set of contacts. It is to both the conduit means and the contact means, of course, that the illuminating means within the body are connected. However, as will be seen hereinafter numerous modifications may be made. The electrical contact means are in every case associated with the means by which the individual links are connected, coupled or joined together so that all wiring, illuminating bulbs, resistors, and the like, are concealed within the bodies of the chain of links.

Accordingly, it is an object of this invention to provide an illuminated chain which may be used as a decorative item.

Another purpose is the provision of an illuminated chain to introduce strong, flexible, continuous length light for more practical applications.

A prime object of this invention is to offer an illuminated chain which is simple in construction, economical to produce, and strong and rugged enough to resist considerable force in either tension or compression.

A further object is to offer an illuminated chain which will not become disconnected when the chain is slack.

Yet another object is to supply a chain link design which offers increased load-carrying capacity over known detachable chain links.

Still another object of this invention is to provide a chain link which may be made of a wide variety of plastic and metal materials.

Further objects, advantages and capabilities will become apparent with reference to the disclosure of this invention in the following description and the appended drawings.

In the drawings:

FIGURE 3 is a partial perspective view of the open end of a chain link;

FIGURE 6 is an elevational cross section of the open end of a link taken along the line 6—6 of FIG. 3;

FIGURE 11 is a perspective view of a bearing insert which is designed to be inserted between sectors at the open end of a link;

FIGURE 12 is a partial elevational view showing the open end of a link and the sector design required to accommodate the insert shown in FIG. 11;

*Improved chain link design*

Referring now to the specific embodiment of FIGS. 1–10, it will be seen with particular attention to FIGS. 3 to 6 that the chain link of this invention is of a generally square U or C shape. Each link, generally shown by number 10, is comprised of base or gullet 12 and extending in the same direction at right angles from opposite ends of said base 12 are opposed arms or sides 14. In the preferred embodiment, the sides 14 are oblong or rectangular in transverse cross section and are substantially parallel to one another.

Figure 4:
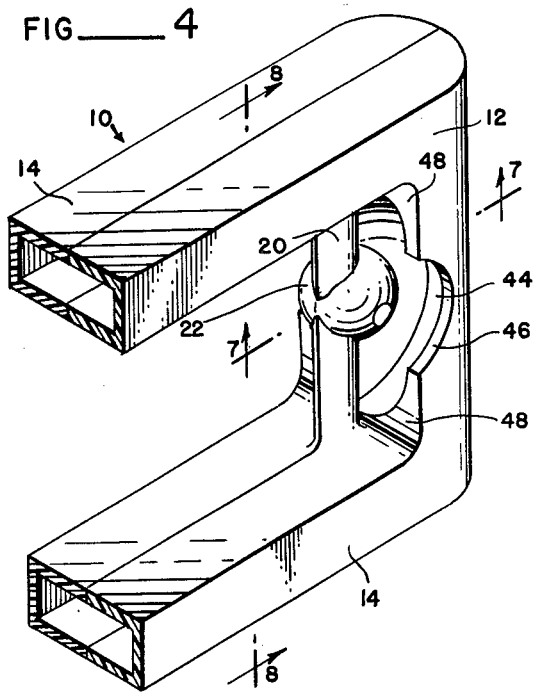
FIGURE 4 is a partial perspective view of the closed or base end of a chain link.
Figure 8:
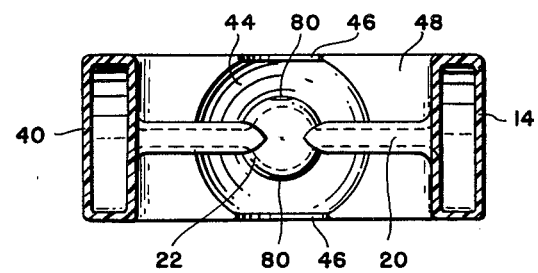
FIGURE 8 is an elevational cross section view (rotated 90°) of the closed end of a link taken along the line 8—8 of FIG. 4.
Figure 9:
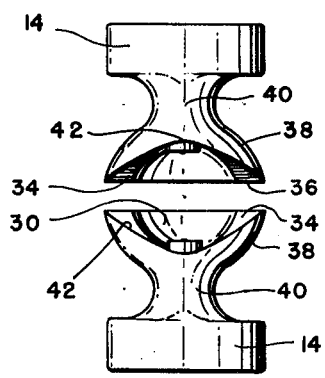
FIGURE 9 is a front elevational view of the open end of the chain link of this invention taken along the line 9—9 of FIG. 3.

The inside wall 48 of base 12, best seen in FIGS. 4 and 8, which faces the open end of the link adjoins a web 20 extending between the sides 14. Web 20 is perhaps one-fifth the thickness of the base 12 and is centered with respect to the depth of the sides and the base.

A spherical depression is formed in the base, which depression occupies the middle half of said base. This depression is formed from a center point located on a line running through the outside surface of wall 48 midway between the top and bottom of sides 14 and midway between the outside surfaces of base 12. The diameter of this depression is slightly greater than one-half the thickness of said base 12. Thus there is formed within the base a theoretically perfect spherical surface 44. Surface 44 serves as the bearing surface or socket for the ball-type jaw at the open end of the link.

Thus it will be seen that wall 48 in effect is broken by the depressed socket or bearing surface 48 shaped into the base 12 proper. Thus, too, web 20 passes directly across the opening caused in wall 48 by said surface 44.

The web 20 is provided with spherical boss or locking ball 22 which may be best seen in FIG. 4. The radius of said spherical boss is projected off the same center point as spherical surface 44. Since the line on which said center point is located lies in the same plane as the surface of wall 48 it is obvious that the web 20 joins boss 22 on that half of said boss which faces the open end of the link.

Also projected on the same center line as spherical boss 22 and surface 44 is the curved surface 46 which is recessed into the top and bottom walls of base 12. The addition of curved surfaces 46 permits greater flexibility of the ball and socket joint than is attainable through applicant's previous design disclosed in the above mentioned patent. Bringing wall 48 into line with the center point of spherical boss 22 and the depressed spherical surface 44, together with the provision of curved surface 46, are particularly significant features of this invention. Curved surface 46, of course, accommodates axles 40 of link so that considerably flexibility of movement between links is achieved. Two fundamental advantages of moving wall 48 into line with the center point of locking ball 22 is that there is provided more bearing surface between sectors 38 and depressed spherical surface 44. Furthermore, the greater surface 44 makes it impossible to spread arms or sides 14 and thus disconnect the links. With greater bearing surface there is given increased load carrying capacity. With the provision of curved surface 46 there is given not only flexibility but room to receive larger axles 40 which also increases load carrying capacity. An additional advantage in this improved design is that locking ball 22 is made castable since undercuts are eliminated.

The open end of a link has integrally connected to sides 14 the inturned ends which are narrowed down to form short necks or axles 40. Axles 40 have connected to the ends thereof the spherical sectors 38. Note that sectors 38 are not full hemispheres but are such that opposing surfaces are spaced apart. The sectors 38 are formed on a theoretically single spherical surface broken only by the gap between said sectors. The diameter of the sphere on which the sectors are formed is only slightly greater than the full width of sides 14 as can be best seen in FIG. 9.

Depressions or recessed areas 30 are carved out of the centers of the flat opposed surfaces of sectors 38. The depressions 30 leave flat peripheral surfaces 36 which are less than half a radius wide if the radius of the circular area formed by the flat surface of sector 38 is used as the reference. Slots 32 are provided in surfaces 36 to permit the sectors 38 to be slipped into a socket over the locking ball 22. Slots 32 are formed in the front wall 36 if the open end of the link is also considered as the front or forward end.

The surface 36 on each side of slot 32 is beveled to eliminate the light sharp feather edges which result from cutting slot 32. Such beveled portions are referred to as bevel surfaces 34. A curved edge or lip 42 is formed by cutting slot 32 in flat surface 36.

Figure 10:
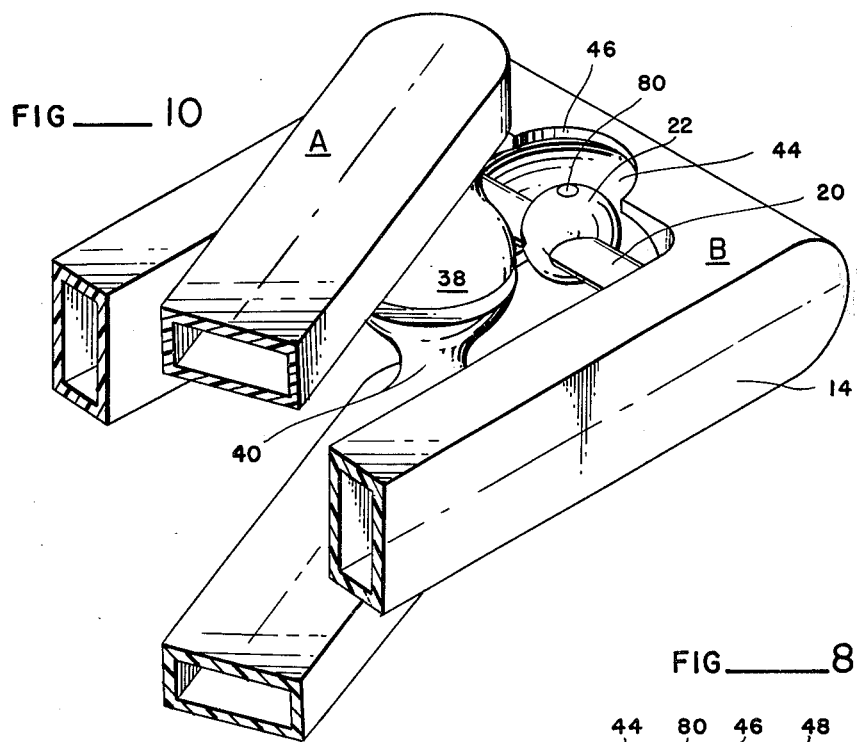
FIGURE 10 is a partial perspective view of two chain links in which one link is shown in the position required in order for the links to be joined.

The relative positions of two links in order to permit joining sector 38 with socket 44 are shown in FIG. 10. The open end of link A is slipped over a side 14 of link B. The base 12 of link A is rotated away from the base of link two until the slots 32 of sectors 38 face locking ball 22 and socket 44. Such arrangement requires rotating the base of link A until it abuts the outside of one of the sides 14 of link B. Then and only then may the sectors 38 of link A be pushed into socket 44 of link B. In order to secure the union of the two links it is only necessary to swing the base of link A a few degrees away from the side 14 of link B.

The locking of the two links occurs as a result of the socket surface 44 coming to bear on sectors 38. The sectors 38 are unable to spread to allow surfaces 36 to clear locking ball 22. Hence the location of slots 32 accounts for the ability of the links to be locked together.

The links, once they are rotated away from each other, form a strong unbreakable chain. Even when suspended between points by a substantial catenary the chain will not become detached because of the extreme rotation required between links to effect a break. Furthermore, the improved design of the link over applicant's earlier design as embodied in the aforementioned patent allows larger axles 40 to be formed at the open end of each link. Hence the load-carrying ability of the link is further enhanced in this additional manner.

Insert bearing

One problem attaching to the nature of the ball and socket joint as exemplified by sectors 38 and spherical socket surface 44 is the wear on said surface by the outside edge of flat surface 36. The wear by such edge results from a certain amount of flexing in the sides 14 of the links. Thus it may be seen that no matter how perfectly the various parts are designed to tolerances the gap between opposing sectors 38 when links are joined will vary minutely to some extent. Thus sectors 38 will not always maintain position as parts of a perfect spherical surface and the edges may gouge surface 44. An additional aspect of the same problem is that when flexing takes place only certain restricted portions of the total available ball and socket surface areas may be in contact, thus throwing increased wearing loads on such restricted portions. Both aspects of the problem presented by flexing are confined for the most part to links made of metal. Plastic would be less inclined to wear in the manner discussed, but where high strength plastics or fiberglass reinforced plastics are used in the links and a chain of such lines carries loads then it may be desirable to include the insert.

Figure 13:
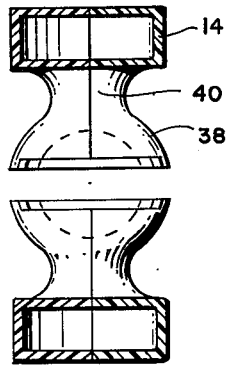
FIGURE 13 is an elevational view of the open end of a link taken from the rear of the open end and further showing the sector design in FIGURE 12.

The insert feature of this invention is shown in FIGS. 11 to 13. FIG. 12 illustrates how the sectors 38 are formed in order to accommodate said insert. Note that the rear or main contact areas of sectors 38 are provided at the junction or edge of the spherical surface of said sectors and the flat surface 36 with grooves or notches 60. The grooves or notches 60 extend around the sector to end walls 62 in such a way as to traverse less than 180° of the circle of surface 36.

The insert shown in FIG. 11 and generally designated by reference number 50, is T-shaped in cross section and in length constitutes a portion only of a full ring. Outside wall or base section 52 is bounded on each end by insert branches 54. The instanding spacer body 56 being of less width than base section 52 defines grooves 58 in conjunction with said base section. The outside surface of base section 52 is formed to coincide with the spherical surfaces of sectors 38 to present an unbroken surface to socket surface 44.

The insert 50 may be made of any essentially nonresilient material which contains compression strength and which has good bearing qualities. Teflon and nylon inserts would be particularly suitable as would other synthetic materials. The insert is designed to fit snugly between the sectors. Once the links have been joined but before the main contact areas, i.e. the backs, of sectors 38 have been rotated into socket 44 the insert 50 is slipped into the grooves 60 and pushed into position. Rotation of the sector into the socket may then be completed. The insert 50 does not have to take the exact shape shown but could be a strip, i.e. no spacer body 56, of material fitted into the grooves 60 of sectors 38 and in which, of course, the outer surface of the insert conformed to the spherical configuration of said sectors.

Illuminating features

A further refinement of this invention over applicant's previously patented link design is an illuminating feature.

The nature of a chain link is such that the outer shell of the body bears the primary stresses and strains. For all practical purposes, then, a chain link may be hollow without damaging its strength characteristics. Chain links are made in solid form, however, because of practical considerations such as time and increased costs for casting or molding the hollow body.

The link of this invention may be made in hollow form to accommodate electrical wiring and lighting features to give a very eye-appealing and highly decorative item.

Figure 1:
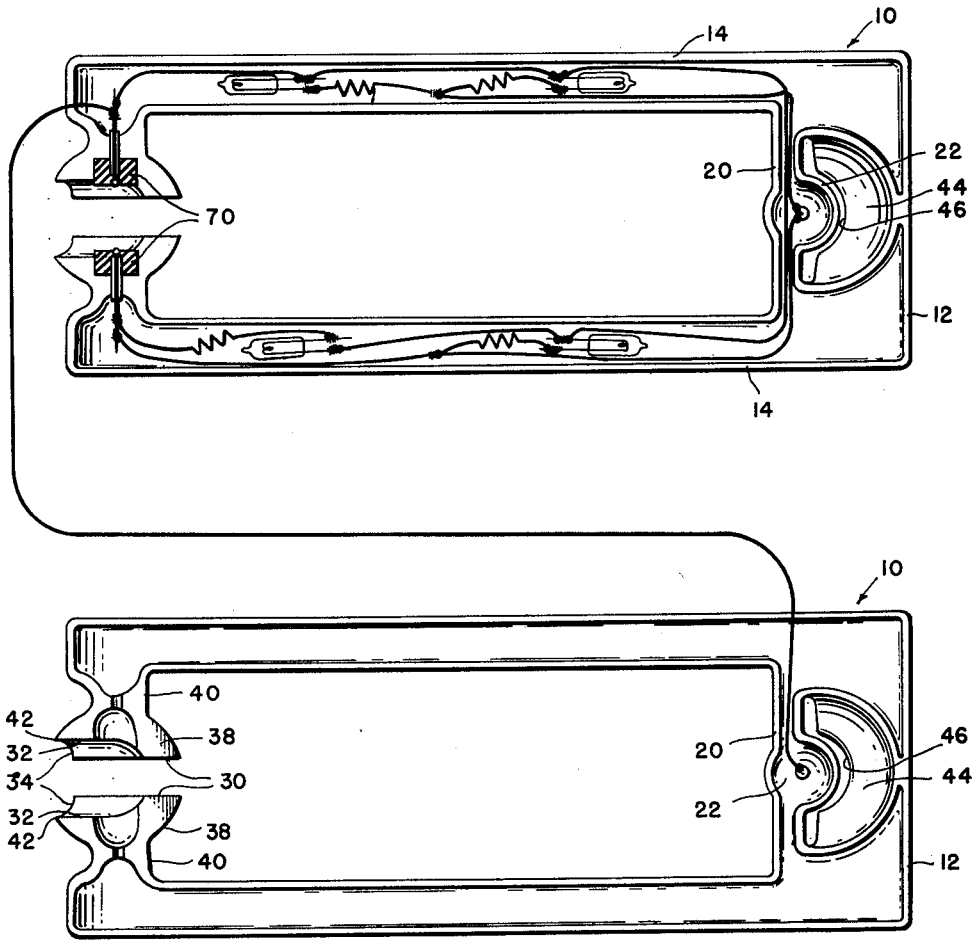
FIGURE 1 is a plan view of the two halves of a chain link in which the inside portions are exposed and showing for the purposes of illustration a parallel type illuminating circuit which may be incorporated in said links.
Figure 2:
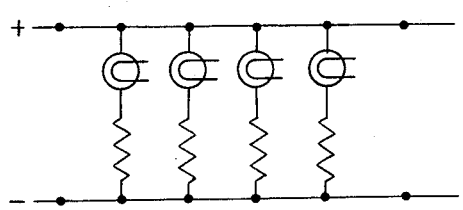
FIGURE 2 is a wiring diagram of the parallel circuit employed in FIG. 1.

FIGS. 1 to 4 and 6 to 9 embody various illustrations of the illuminating features of this invention. FIG. 1 shows a hollow chain link cut in half with a suggested wiring arrangement. If the wiring is traced it will be seen to be equivalent to the simple parallel circuits of FIG. 2. Parallel circuits are recommended for the obvious fact that if one bulb burns out none of the remainder of the bulbs will be affected.

FIG. 6 is particularly illustrative of the arrangement of electrical contacts on the open end of a link, with FIGS. 1 and 3 lending perspective thereto. Soft rubber, cylindrically shaped insulators 70 are mounted in cavities in one half of a hollow link. Each insulator has provided therein a stationary guide sleeve 74 which is so positioned that it protrudes from the concealed side but does not extend through the entire thickness of said insulator. The contact head 72 has attached thereto a long, almost pin-like shaft 76. The shaft is pushed into the rubber and through the bore of the guide sleeve 74 to extend into the cavity within side 14. The contact head shaft is slidably mounted within said sleeve but held against loose movement by the insulator 70 contacting the head end of shaft 76. Thus, insulator 70 also acts as a spring to bias the contact head into the position shown in the desired position and holds the head 72 within depression 30. Insulators 70 also serve to seal both the discs 80 and heads 72 against the weather.

Figure 7:
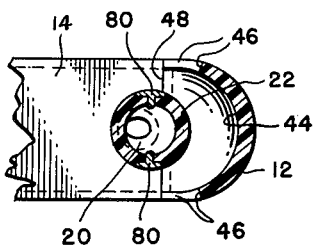
FIGURE 7 is an elevational cross-section view of the closed end of a link taken along the line 7—7 of FIG. 4.
Figure 5:
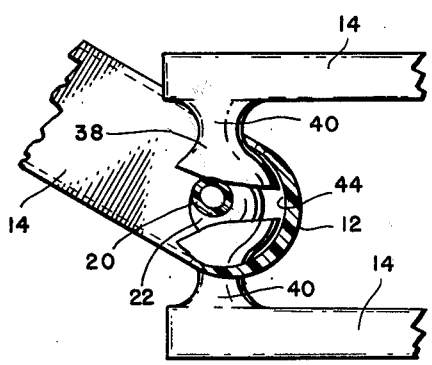
FIGURE 5 is an elevational view in partial section showing the degree of rotation or flexing possible in one plane when two links are joined.

The closed end contacts are mounted on locking ball 22 and the details thereof are best shown in FIGS. 1, 7 and 8. The contacts or discs 80 are of brass or other suitable conductive material and are considerably larger in diameter than the small contact heads 72 in the depressions 30. The discs 80 need not be mounted in insulators since the plastic body of the link is non-conductive. Any manner of mounting discs 80 on locking ball 22 is acceptable. A drop or two of solder on the inside of the ball 22 will secure favorable mounting of said discs. The discs are mounted so that when two links are joined the heads 72 are brought into contact with discs 80. The larger diameter of the discs 80 permits the links to be rotated and flexed without disrupting the contact between head 72 and disc 80.

The sliding contacts described are only one method by which the transfer of current and voltage may be made from link to link. Pivot, or slip ring, contacts may be used. Induction type transfers may be employed to eliminate physical contacts, but this is more expensive and entails power losses. In reality the variations by which the power transfer can be made are limited only by the nature of the links themselves and the ingenuity of those skilled in the art of commutating.

The lighting means may also assume many forms. Bulbs may be larger. The link may be a bulb in and of itself. Blinkers may be employed. It is contemplated that a breaker will be employed at one of the terminals of the chain to provide a safety feature. Thus, if for some reason the circuit is broken the breaker will trip so that no live contacts are available to be touched.

Figure 14:
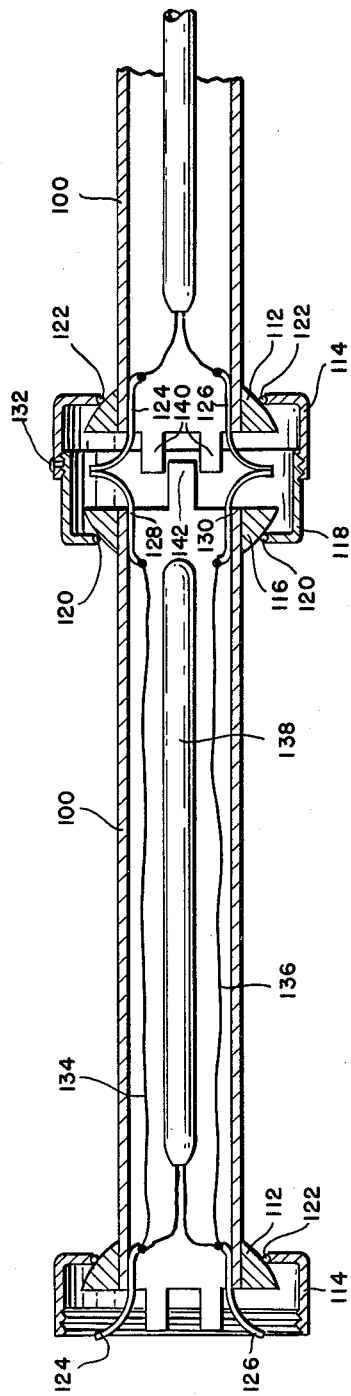
FIGURE 14 is an elevational cross section view of an alternative embodiment of this invention showing two links.

FIG. 14 illustrates a variable form of link which could be used in a continuous light chain. This particular embodiment is less expensive to make than the chain link heretofore described. The body of the link is a straight plastic tube 100 of the desired diameter and length. Each end of the tube has permanently secured thereto, by some form of suitable cement, adhesive or glue, spherical washers 112 and 116 which are essentially triangular in cross section. The inside or tube contacting surface of washers 112 and 116 fit snugly over the outside of tube wall 100. The ends or outside surfaces of washers 112 and 116 are flush with and in a plane coincident with the tube end. A back or rear surface slopes backwardly in a slightly rounded fashion to join with the inside surface to complete the triangular cross section. Epoxy resins are a particularly good adhesive for bonding the washers 112 and 116 to the tube 100.

The tubes are joined in sausage fashion by virtue of ring or coupling nuts 114 and 118. In order that the coupling nuts 114 and 118 become an undetachable part of each link, said nuts are slipped on to the tube before the washers 112 and 116 are bonded thereto. Thus, a link has two coupling nuts slidable along the length of the tube with such nuts incapable of being taken off. It will be noted that coupling nut 114 is larger in diameter than coupling nut 118. Threads are cut on the outside surface of nut 118 and on the inside surface of nut 114 so that the links may be threadably joined.

Provision is made for a set screw 132 to be received through the union of nuts 114 and 118 to insure that the union is maintained. The set screw 132 is so designed that a special wrench is necessary to remove it. Thus, the union will also be preserved against parties who would maliciously tamper with the chain.

Each coupling nut 114 or 118 is L shaped in cross section. The short leg is slightly heavier than the long leg and serves to contact the spherical washers 112 and 116. The diameter of the contact edge of the nuts 114 or 118 is less than the largest outside diameter of washers 112 and 116. Hence, the coupling nuts are not a disconnectable part of an individual link.

Each coupling nut 114 and 118 has associated therewith an O or sealing ring. Sealing ring 120 fits into an annular cavity or groove in the washer contacting surface of nut 118 and sealing ring 122 fits into an annular cavity or groove in the washer contacting surface of nut 114. Such sealing rings 120 and 122 are for the purpose of protecting the joints against penetration by water and other deleterious matter. The nature of the coupling is such that considerable flexing is possible between links. At no time, even during the most extreme flexing, are the contacting surfaces of the coupling nuts out of contact with the washer surfaces.

The electrical contacts 124, 126, 128 and 130 are placed in pairs at each end of the tube. Contact 124 is portioned diametrically to contact 126, and contact 128 is diametrically placed with respect to contact 130. All electrical contacts are spring steel or other suitable metal strips. One end of a contact is cemented to the inside surface of the tube. The contact protrudes out of the end of the tube and bends outwardly. Thus the end of contact 124 is designed to touch contact 128 on the adjoining link and contact 126 touches contact 130 on the adjoining link. In this manner electrical power is conveyed from link to link.

The lighting arrangement within a tube or link is optional. For purposes of illustration a simple arrangement of wiring is shown in which contacts at one end of a tube are directly connected by wires 134 and 136 to contacts at the other end of the tube. A light source 138 is connected to the contacts. The link is complete and may now be joined to other identical links to form a continuous light chain. As with the alternative embodiment, a circuit breaker is installed at the terminal end of a chain to cut off the power in case the chain is broken. The contacts at the ends of the tubes may be composed of concentric slip rings.

In the arrangement shown the contacts are strips of metal. Under the circumstances it is necessary to prevent rotation of the tube links to eliminate the possibility of losing touch between the matching contacts. Tongue and groove members 140 and 142 are provided at the ends of the tube walls to restrain relative rotation between links. If concentric slip ring contacts are employed the tongue and groove features may be dispensed with.

In order to assemble a chain as described above it is only necessary to slip the open end of one link over the narrow dimension of a side portion of another link. One link, as link A in FIG. 10, is rotated to the position shown with the jaw or sectors facing the socket and locking ball of link B. Link A is then pushed toward the base portion of link B. The slots 32 in the sectors permit the sectors to move into contact with the depressed socket surface. As the base portion of link A is rotated away from link B a complementary locking of the two links is achieved. The locking ball 22 prevents the sectors from moving out of the socket and the socket surface prevents the jaw from spreading so as to allow the sectors to slip off the locking ball. Thus as many links as desired may be joined together. In the event the chain is broken by a defective link the detachable nature of the links permits the chain to be restored by simply inserting a new link.

In the case of the illuminated links it should be recognized that one of the terminal intermediate links must be provided with an electrical power inlet cord to permit connecting the chain with an appropriate electrical outlet.

In the event a chain having solid metal link bodies is used under stress it may be desirable to use the insert bearing. If so, the links are joined as described above. The bearing is then inserted between the sector grooves and link A is turned to rotate the insert completely within the ball and socket joint formed by the depressed socket surface and the jaw sectors.

It is to be understood that the showing of applicant's chain link and the insert bearing and illuminating features therefore are very diagrammatic and that the invention is capable of many refinements which will readily occur to those skilled in the art. The base and side portions of a link may assume shapes other than those shown. The illuminating feature is particularly flexible since many kinds of light means and link-to-link contact means may be incorporated. Furthermore, the insert bearing may be of different shapes and materials. Thus, it is obvious that many variations in each of said features could be used without departing from the spirit of the invention. It is intended, therefore, not to be limited except as indicated by the scope of the subjoined claims.

What is claimed is:

1. An illuminated chain in which an individual link comprises:
   (a) a translucent, plastic, generally U-shaped body formed by a base portion and two side portions;
   (b) a web connecting said side portions adjacent said base portion;
   (c) a depressed surface area in said base portion and centered between said side portions;
   (d) a ball formed on said web and centered between the two side portions;
   (e) the free ends of said side portions having inwardly turned extensions enlarged at their ends to form a jaw, the opposed faces of said enlarged ends of said extensions having depressions therein to match and clamp onto the ball of an adjoining link, said depressed surface area being adapted to receive said enlarged ends in the manner of a ball and socket joint;
   (f) illuminating means within said U-shaped body; and
   (g) electrical contacts on said ball and in said depressions so that as individual links are joined said electrical contacts convey electrical power from one link to another.

2. An illuminating chain in which an individual link comprises:
   (a) a hollow, translucent, plastic, generally U-shaped body formed by a base portion and two side portions;
   (b) a web extending between said side portions adjacent said base portion;
   (c) a ball on said web and centered between said side portions;
   (d) a depressed surface area in said base portion forming a socket;
   (e) the free ends of said side portions having inwardly turned extensions in the form of spherical sectors each of which sectors has a flat circular surface thereon, the flat circular surface on the sector of each side portion facing the corresponding surface on the other side portion and slightly spaced therefrom to form a jaw, said sectors being adapted to be received in said depressed surface in the manner of a ball and socket joint;
   (f) a depression in the center of each flat circular surface and a slot leading from the forward edge of each said flat circular surface to said depression, said slot serving to permit said ball to be received in said depression and to permit individual links to be detachably connected on to another;
   (g) illuminating means within said U-shaped body;
   (h) electrical contact means on said ball and in said depressions, said electrical contact means in said depressions being matched to said electrical contact means on said ball to convey electrical power from one link to another.

3. An illuminated chain in which an individual link comprises:
   (a) a hollow, translucent, plastic, generally U-shaped body formed by a base portion and two side portions, said U-shaped body being divisible into two parts of the same general U-shape for permitting access to the inside of said body.
   (b) a web extending between said side portions adjacent said base portion;
   (c) a ball formed on said web and centered between said side portions;
   (d) a depressed bearing surface in said base portion forming a socket surrounding a portion of said ball;
   (e) the free ends of said side portions having inwardly turned extensions in the form of spherical sectors each of which sectors has a flat circular surface thereon, the flat circular surface on the sector of each side portion facing the corresponding surface on the other side portion and slightly spaced therefrom to form a jaw, said sectors being adapted to be received in said depressed surface in the manner of a ball and socket joint;
   (f) a depression in the center of each flat circular surface and a slot leading from the forward edge of each said flat circular surface to said depression, said slots permitting said ball to be received in said depression and to permit individual links to be detachably connected one to another;
   (g) illuminating means within said U-shaped body; and
   (h) electrical contact means on said ball and in said depressions, said contacts on said ball being matched to said contacts in said depressions to convey electrical power from one link to another.

4. In a chain, a chain link comprising:
   (a) a generally U-shaped body formed by a base portion having a base wall facing the open end of said body and two side portions;
   (b) a depressed spherical surface in said base portion, said depressed surface being projected from the center point located in a plane coincident with a base wall facing the open end of said body and centered midway between said side portions;
   (c) a web extending between said side portions adjacent said wall of said base portion;

(d) a locking ball on said web and having its center point coincident with the center point of said spherical surface, the surface of said locking ball being uniformly spaced from said depressed spherical surface;

(e) the free ends of said side portions having inwardly turned extensions in the form of spherical sectors each of which sectors has a flat circular surface area thereon, the flat circular surface on the sector of each side portion facing the corresponding surface on the other side portion and slightly spaced therefrom to form a jaw;

(f) a depression in the center of each flat circular surface and a slot leading from the forward edge of each of said surfaces to each of said depressions, said slot permitting said jaw to slide over said locking ball on an adjoining link to bring said spherical sectors into bearing relationship with said depressed spherical surface to form a ball and socket joint.

5. The chain link according to the structure of claim 4 in which a semi-circular surface is formed on both top and bottom sides of said base portion, the center points of said semi-circular surfaces being coincident with a line running through the centers of said locking ball and said depressed spherical surface.

6. The chain link according to the structure of claim 5 in which said inwardly turned extensions are relieved to form axles between said sectors and said side portions.

7. In a chain, a chain link, comprising:

(a) a generally U-shaped body formed by two side portions and a base portion having a base wall facing the open end of said body;

(b) a depressed spherical surface in said base portion, said depressed surface being projected from a center point located in a plane coincident with the base wall facing the open end of said body and centered midway between said side portions;

(c) a web extending between said side portions adjacent said wall of said base portion;

(d) a locking ball on said web of lesser diameter than said depressed spherical surface and having its center point generally coincident with the center point of said spherical surface, the surface of said locking ball being uniformly spaced from said spherical surface, and the center point of said base wall being generally coincident with the center point of said locking ball, and notches in said base portion defining curved surface means between said depressed spherical surface means and the outside surface of said base portion.

(e) the free ends of said side portions having inwardly turned extensions in the form of spherical sectors, each of which sectors has a flat circular surface thereon, the flat circular surface on the sector of each side portion facing the corresponding surface on the other side portion and slightly spaced therefrom to form a jaw;

(f) a depression in the center of each flat circular surface and a slot heading from the forward edge of each of said surfaces to each of said depressions, said slot permitting said jaw to slide over said locking ball on an adjoining link to bring said spherical sectors into bearing relationship with said depressed spherical surface to form a ball and socket joint.

8. The structure according to claim 7 and in which said body is hollow, translucent plastic.

9. The structure according to claim 8 in which there are illuminating means within said body and in which there are electrical contact means on said ball and in said depressions, said electrical contact means in said depressions being matched to said electrical contact means on said ball to convey electrical power from one link to another.

References Cited by the Examiner
UNITED STATES PATENTS

| | | | |
|---|---|---|---|
| 1,438,344 | 12/22 | Sweet | 59—78.1 |
| 1,878,447 | 9/32 | Sutphen | 240—2 |
| 2,618,922 | 11/52 | Johnson | 59—85 |
| 2,759,096 | 8/56 | Caissie | 63—4 |
| 3,061,715 | 10/62 | Thomas | 240—9 XR |

FOREIGN PATENTS

| | | |
|---|---|---|
| 26,287 | 11/52 | Great Britain. |

WILLIAM J. STEPHENSON, *Primary Examiner.*

EDWARD C. ALLEN, CARL W. TOMLIN, *Examiners.*